United States Patent [19]

Salo

[11] Patent Number: 4,770,373

[45] Date of Patent: Sep. 13, 1988

[54] QUICK RELEASE LADDER DEVICE FOR HELICOPTERS

[76] Inventor: Randall J. Salo, 4019 W. Rancho Dr., Phoenix, Ariz. 85019

[21] Appl. No.: 943,165

[22] Filed: Dec. 18, 1986

[51] Int. Cl.$^4$ .............................................. B64D 25/00
[52] U.S. Cl. .............................. 244/137.4; 244/17.11; 182/93; 182/198
[58] Field of Search ............... 214/137.1, 137.2, 137.4, 214/17.11; 182/196, 197, 198, 93, 206; 244/905

[56] References Cited

U.S. PATENT DOCUMENTS

| | | | |
|---|---|---|---|
| 966,447 | 8/1910 | Huff | 182/196 |
| 2,378,913 | 6/1945 | Dahlander | 182/198 |
| 3,397,432 | 8/1968 | Banas | 244/905 |

*Primary Examiner*—Galen Barefoot
*Assistant Examiner*—Rodney Corl
*Attorney, Agent, or Firm*—Cahill, Sutton & Thomas

[57] ABSTRACT

A rescue ladder for air to ground deployment is provided with a quick release mechanism which enables the ladder to be detached from an aircraft in case of emergency. The quick release mechanism includes fastener pins mounted on a rotatable control shaft, and a safety lock for locking the control shaft against accidental rotation. Normally, the fastener pins are received in apertures provided in connector straps which extend from the rescue ladder, but when an emergency occurs, it is simply necessary to unlock the control shaft and rotate it so that the fastener pins are lifted out of the apertures in the connector straps, thus detaching the ladder. Other features of the ladder include a weighted bottom rung, and a solid steel, wheel-mounted top rung which acts as a standoff mechanism.

14 Claims, 1 Drawing Sheet

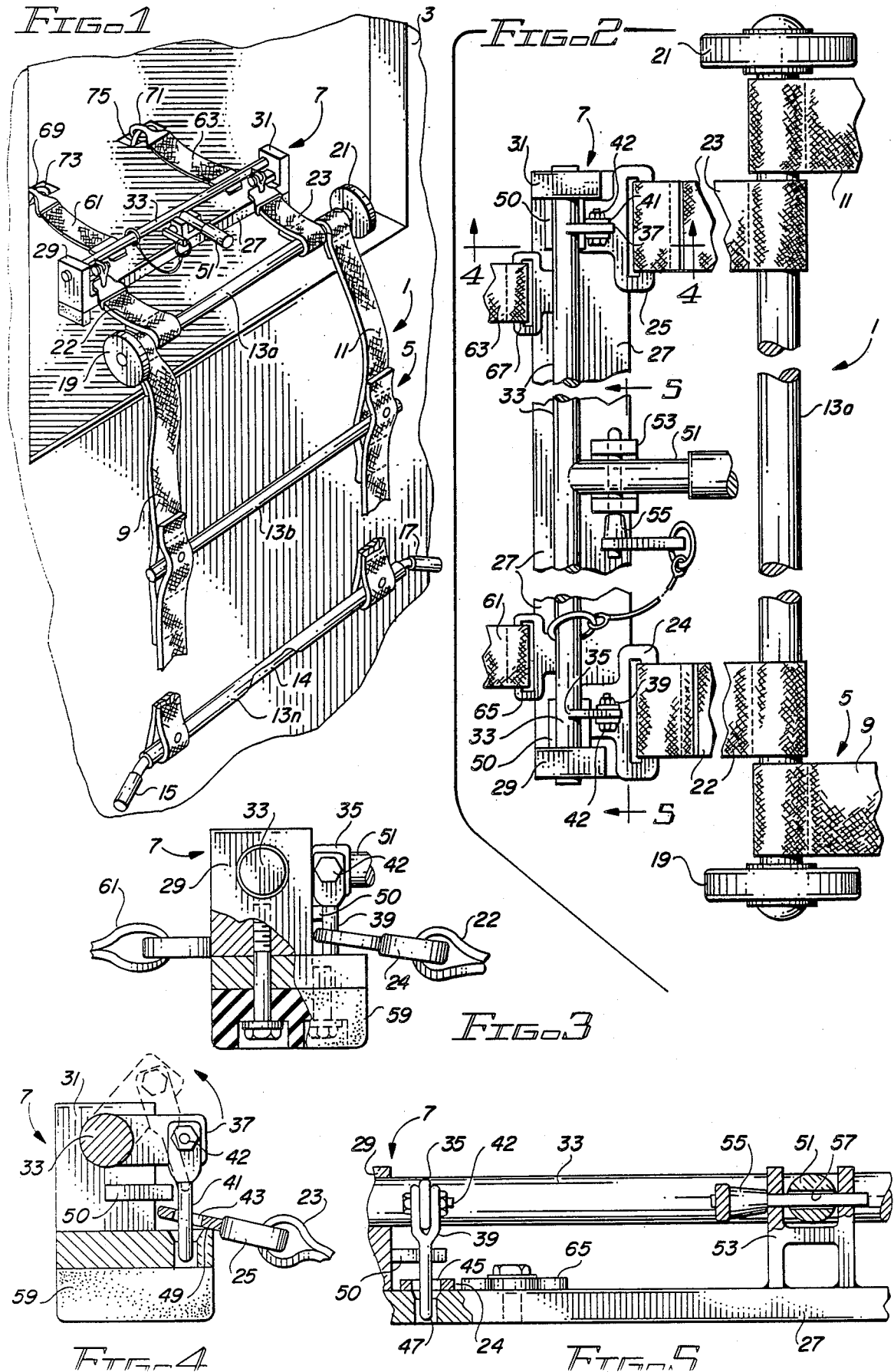

QUICK RELEASE LADDER DEVICE FOR HELICOPTERS

BACKGROUND OF THE INVENTION

1. Field of the Invention

This invention relates in general to rescue ladder devices and, more particularly, to a ladder designed to be deployed from a helicopter and rapidly detached therefrom in case of entanglement or other emergencies.

2. Description of the Prior Art

Easily maneuverable aircraft such as helicopters and small planes often play a critical role in civilian and military rescue operations, especially in locations which are not easily accessible to conventional land or sea vehicles. Typically, rescue aircraft are outfitted with lightweight ladders which can be rolled up and easily stored in the aircraft. When needed, a ladder may be removed from its place of storage and secured near the aircraft door by hooking, tying or otherwise securing a rope or fabric attachment portion of the ladder to a pair of D-rings located in recessed portions of the aircraft floor.

The prior art ladder devices have suffered from a number of drawbacks. One problem has been that the ladders, which typically consist of sidepieces made from rope or nylon webbing and rungs made from wood or aluminum, are too lightweight. While lightness is generally considered an advantage in terms of convenience of storage and portability and the like, it becomes a disadvantage when it comes to rapidly deploying the ladder from the aircraft, because a light ladder tends to drop more slowly than a heavy ladder, and to sway in response to wind and air currents, and could even become entangled with the aircraft. Even under ideal conditions, the few seconds which could be lost as a result of a slow and swaying deployment of the ladder may well be critical in an emergency situation.

Another problem associated with conventional aircraft rescue ladders has been that, because the attachment portion of the ladder extends flatly over the vehicle floor, the top rung of the ladder lies directly on the floor, and thus cannot be effectively grasped or grabbed by a climber on the rungs below. This can result in the climber losing his or her balance or greatly slowing his or her entry into the aircraft. In the past, aircraft personnel have attempted to alleviate this problem by placing planks of wood underneath the ends of the top rung in order to vertically offset the rung from the aircraft floor, making it easier to grab. This practice can be quite dangerous, however, because should the planks become dislodged from underneath the rung, they could easily fly about inside the aricraft or fall out of the aircraft and strike bystanders below. In addition, the planks of wood can be cumbersome to store in an aircraft already filled with rescue and other equipment. Furthermore, the process of placing the planks under the ladder is time-consuming and wasteful.

Still another problem associated with aircraft ladders is that they have been known to become entangled in trees or other obstructions, thus preventing the aircraft from making a swift getaway. Consequently, it is necessary to detach the ladder from the aircraft. In combat situations or disaster situations such as fires, the time involved in releasing the ladder by unhooking or untying the attachment portion from the D-rings in the aircraft simply cannot be afforded. Thus, the most common solution in the past has been to simply chop off the attachment portion with a hatchet or ax. Even this practice may be too slow, however, if the ax is not swung with sufficient force. In addition, the ax is a difficult and rather dangerous piece of equipment to handle, particularly in a moving aircraft.

Therefore, a need exists for a new and improved aircraft rescue ladder which overcomes some of the problems and shortcomings of the prior art.

SUMMARY OF THE INVENTION

In accordance with the present invention, a new and improved quick release ladder device is disclosed for rapid air to ground deployment and retrieval from aircraft such as helicopters and for quickly releasing the ladder in emergencies. The quick release ladder device, or assembly includes two major components; a preferred ladder structure and a quick release mechanism which demountably attaches the preferred ladder, or any other suitable ladder to the aircraft.

The preferred ladder comprises a pair of sidepieces and a plurality of rungs extending between the sidepieces. The majority of the rungs are made from a lightweight material in order to make the ladder easy to carry and store. However, the lowermost rung is weighted in order to make the ladder drop rapidly, and to prevent it from swaying in the wind. The top rung is made from a stronger material such as solid steel which enables it to withstand the forces exerted on it by a climber on the lower rungs of the ladder. Furthermore, the top rung of the ladder has a wheel mounted at each end. The wheels support the rung above the floor of the aircraft, enabling the rung to be easily grasped by a climber ascending the ladder. The wheels also act as a standoff mechanism, causing the ladder to roll slightly forwardly or backwardly to counteract the stresses and forces exerted by the climber. In addition, the top rung of the ladder is provided with fastener receiving connector means for joining the ladder to the quick release mechanism.

The quick release mechanism comprises fastening means engageable with the fastener receiving connector means provided at the upper end of the ladder, and control means are provided for selectively moving the fastening means into and out of engagement with the fastener receiving connector means or the ladder for holding the ladder and releasing it in emergency situations. In addition, the mechanism includes locking means which prevent the control means from being accidentally activated and unintentionally detaching the ladder from the aircraft.

Accordingly, it is an object of this invention to provide a quick release ladder assembly which can be readily deployed from a helicopter and can be easily operated to detach the ladder from the helicopter in the event of entanglement or other emergency.

Another object of the invention is to provide a quick release mechanism for a ladder which includes a safety lock for preventing the ladder from accidentally being detached.

Another object of the invention is to provide a quick release mechanism in combination with a preferred ladder having a stand off mechanism for making the top rung of the ladder easy to grap and for counteracting the forces and stresses exerted on the ladder by a climber.

Yet another object of the invention is to provide a quick release mechanism and preferred ladder combination wherein the ladder has a weighted bottom rung for quickly deploying the ladder and preventing it from swaying.

The foregoing and other objects of the present invention as well as the invention itself, may be more fully understood from the following description when read in conjunction with the accompanying drawings.

BRIEF DESCRIPTION OF THE DRAWINGS

FIG. 1 is a fragmentary view in perspective showing the quick-release mechanism and preferred rescue ladder device of the instant invention in a deployed position relative to an aircraft.

FIG. 2 is a fragmentary view from above showing the quick release mechanism of the instant invention.

FIG. 3 is an end view, partially broken away, showing the quick release mechanism of the instant invention.

FIG. 4 is a sectional view taken through line 4—4 of FIG. 2.

FIG. 5 is a sectional view taken through line 5—5 of FIG. 2.

DESCRIPTION OF THE PREFERRED EMBODIMENT

Referring more particularly to the drawings, FIG. 1 shows the quick release mechanism and rescue ladder assembly of the present invention, generally indicated by the numeral 1, in a deployed position relative to an aircraft 3 such as a helicopter or small airplane. The quick release mechanism and ladder assembly 1 includes two major components; namely, a preferred ladder structure 5 and a quick release mechanism 7 which demountably and releasably attaches the ladder 5 to the aircraft 3.

The ladder 5 comprises a pair of parallel, spaced apart sidepieces 9, 11 and a plurality of rungs 13a-n which extend horizontally, at vertically spaced apart intervals, between the sidepieces 9 and 11. For optimum performance, sidepieces 9 and 11 should be made from a webbing material such as nylon and lower rungs 13b-n of the ladder should be made from aluminum or other lightweight material. Bottom rung 13n should be tubular and weighted such as, with a lead core as indicated at 14 in FIG. 1, to provide extra weight when the ladder is deployed. In addition, the bottom rung 13n may be provided with attachment lugs for attaching chemical glow lights 15, 17.

Top rung 13a of the ladder 5 is preferably made from solid steel in order to provide the strength and weight needed to sustain the forces exerted on the ladder by a climber on the lower rungs 13b-n. In addition, the top rung 13a has a wheel 19, 21 mounted at each end. The wheels 19, 21 support top rung 13a above the floor of the aircraft, enabling the rung 13a to be easily grasped by a climber ascending the ladder. The wheels 19, 21 also act as a standoff mechanism which counteracts the stresses and forces exerted by the climber. The top rung 13a is also provided with a pair of straps 22, 23, having suitable connectors 24, 25 on the extending ends thereof for joining the ladder 5 to the quick release mechanism 7 as will be described hereafter.

The quick release mechanism 7 comprises a portable support member having a horizontally extending cross bar 27 and a pair of bearing elements 29, 31 which project upwardly from opposite ends of the cross bar 27. A control shaft 33 is supported above the cross bar 27, with the two opposite ends of the shaft 33 being journalled for rotation in the two bearing elements 29, 31. In addition, a lever or plate member 35, 37 extends radially from near each of the ends of the control shaft 33. A fastening pin 39, 41 is secured to the distal end of each of the levers 35, 37 by means of suitable pivot pins 42.

When the quick release mechanism is in its normal or closed position as shown in solid lines in FIG. 4, the control shaft 33 is oriented such that the radial levers 35, 37 extend substantially parallel to the aircraft floor and outwardly toward the exit door of the aircraft 3, and the fastening pins 39, 41 depend perpendicularly from the levers 35, 37. The pins 39, 41 project through fastener receiving holes 43, 45 provided in the the connectors 24, 25 of the straps 22, 23, and are received in apertures 47, 49 formed in the cross bar 27. However, when the control shaft 33 is rotated in a counterclockwise direction about its longitudinal axis, flanges 35 and 37 move upwardly, as indicated in the dashed line position of FIG. 4, lifting fastening pins 39, 41 out of the holes 43, 45 in the connectors 24, and 25 of the straps 23, 25, thus causing the ladder 5 to become detached from the quick release mechanism 7, and to fall from the aircraft 3. As best seen in FIG. 4, when the pins 39, 41 are in their lifted positions, they are in engagement with guide plates 50 that are mounted on the bearing elements 29, 31 and hold the pins 39, 41 in alignment with the holes 47, 49 of the cross bar 27 to facilitate reinsertion.

The means for controlling the rotation of the control shaft 33 comprises a rod-like handle 51 which extends perpendicularly from the center of the control shaft 33. In the normal, or closed, position, the handle 51 is received in a clevis 53 mounted on the cross bar 27 of the quick release mechanism 7. A locking pin 55 having a manually releasable safety catch of the type well known in the art extends through the clevis 53 and through a bore 57 in the handle 51 to retain the control shaft in its normal or closed position. If an emergency situation calling for the detachment of the rescue ladder 5 occurs, it is simply necessary to release the safety catch on the locking pin 55, withdraw the locking pin 55 from the clevis, and pull upwardly on the handle 51 to rotate the control shaft 33 counterclockwise, thus pulling the fastening pins 39, 41 out of engagement with the fastener receiving holes in connectors 24 and 25 of the straps 22, 23, on the rescue ladder 5. This three-step procedure is extremely simple, and can be carried out in a fraction of a second, yet is still complex enough to prevent the ladder from being released accidentally or inadvertently.

When the quick release mechanism and ladder assembly 1 is not in use, it is usually rolled up and stored in a portable bag (not shown) which can easily be stashed underneath a seat or in the storage compartment of the aircraft 3. When needed, the assembly 1 is removed from its storage place and positioned near the doorway of the aircraft 3.

Preferably the underside of cross bar 27 of the quick release mechanism 7 is provided with a protective bumper or bumpers 59 made of a soft material such as rubber or foam which prevents the mechanism 7 from scuffing or scratching the floor of the aircraft. In addition, cross bar 27 is provided with a pair of fastener straps 61, 63 which have connectors 65, 67 on their prozimal ends which are bolted or otherwise attached to the cross bar 27, and have suitable clasps 69, 71 on their distal ends which are engageable with the customary D-rings 73, 75 provided in the floor of the aircraft 7 as shown for attaching the quick release mechanism 7 and thus the assembly 1 to the aircraft in the conventional manner.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A quick release ladder assembly for use with aircraft, the assembly comprising:
    (a) a ladder having a pair of vertically extending sidepieces and a plurality of spaced apart horizontal rungs including a top rung and a bottom rung;
    (b) connector means fixedly attached to the top rung of said ladder; and
    (c) a quick release mechanism for demountably attaching said ladder to the aircraft, said quick release mechanism including,
    I. a cross bar,
    II. means extending from said cross bar for demountably coupling said quick release mechanism to the aircraft,
    III. fastener means movably mounted on said cross bar for movement between a first position of engagement with said connector means and a second position of disengagement with said connector means,
    IV. control means mounted on said cross bar for moving said fastener means between said first and second positions.

2. The assembly of claim 1, further comprising locking means for releasably locking said fastener means in said first engaged position to prevent accidental movement thereof to said second disengaged position.

3. The assembly of claim 1, in which said top rung of said ladder is made of a solid material, and each of the other rungs of the ladder is of tubular configuration.

4. The assembly of claim 1, wherein said bottom rung of said ladder is tubular and has a solid relatively heavy core therein.

5. The ladder device of claim 1 in which said top rung of said ladder is mounted on wheels for supporting said top rung above the floor of said aircraft and counteracting any forces exerted on said ladder by a climber.

6. A mechanism for releasably coupling a rescue ladder to an aircraft, said mechanism comprising:
    (a) a support member;
    (b) means extending from said support member for demountable connection to the aircraft;
    (c) fastener means movably mounted on said support member for movement between a ladder engaging position and a ladder releasing position; and
    (d) control means connected to said fastener means for selective movement of said fastener means between said ladder engaging and ladder releasing positions, said control means including:
    I. a control shaft having a longitudinal axis, said control shaft being rotatably mounted on said support member for rotation about said longitudinal axis;
    II. lever means extending radially from said control shaft, with said fastener means being secured to said lever means; and
    III. means for rotating said control shaft so that said fastener means moves from said ladder engaging position to said ladder releasing position.

7. The mechanism of claim 6, in which said means for rotating said control shaft comprises a rod-like handle extending perpendicularly from said control shaft.

8. The mechanism of claim 7, further comprising locking means for releasably connecting said control means to said support member when said fastener means are in said ladder engaging position to prevent accidental movement thereof to said ladder releasing position.

9. The mechanism of claim 8, in which said locking means comprises:
    (a) a clevis for receivign said rod-like handle;
    (b) a bore formed in said rod-like handle; and
    (c) a manually releasable locking pin insertable through said clevis and through said bore in said rod-like handle for preventing said handle from moving out of said clevis until said locking pin is released.

10. A quick release mechanism for demountably attaching a rescue ladder to the floor of an aircraft, the rescue ladder having apertured connector means on its upper end, said mechanism comprising:
    (a) a portable support member for placement on the floor of the aircraft, said support member comprising a horizontally extending cross bar having a pair of bearing elements projecting upwardly from the opposite ends thereof;
    (b) a control shaft having two opposite ends journalled for rotation in said bearing elements;
    (c) a pair of lever means each extending radially from proximate a different one of the ends of said control shaft for rotation therewith;
    (d) fastener means for attaching the rescue ladder to said support member when the ladder is positioned on the floor of the aircraft, said fastener means comprising a pair of pins each attached to a different one of said lever means for engagement with the apertured connector means of the rescue ladder;
    (e) means for rotating said control shaft from a first position in which said fastener means are engaged with the apertured connector means of the ladder when the ladder is positioned on the floor of the aircraft to a second position in which said fastener means are disengaged from the connector means when the ladder is positioned on the floor of the aircraft; and
    (f) means for demountably attaching said support member to the floor of said aircraft.

11. The quick release mechanism of claim 10, in which said means for rotating said control shaft comprises a rod-like handle extending perpendicularly from said control shaft.

12. The quick release mechanism of claim 10, further comprising locking means for locking said control shaft in said first position.

13. The quick release mechanism of claim 12, in which said locking means comprises:
    (a) a clevis projecting upwardly from said cross bar for receiving said rod-like handle;
    (b) a bore formed in said rod-like handle; and
    (c) a manually releasable locking pin insertable through said clevis and through said bore in said rod-like handle for preventing said handle from moving out of said clevis until said locking pin is released.

14. The quick release mechanism of claim 10, in which said support member comprises bumper means attached to the underside of said cross bar for protecting the floor of the aircraft from scuffing.

* * * * *